United States Patent [19]

Laine

[11] Patent Number: 4,906,493

[45] Date of Patent: Mar. 6, 1990

[54] METHOD OF PREPARING COATINGS OF METAL CARBIDES AND THE LIKE

[75] Inventor: Richard M. Laine, Palo Alto, Calif.

[73] Assignee: SRI International, Menlo Park, Calif.

[21] Appl. No.: 170,180

[22] Filed: Mar. 18, 1988

Related U.S. Application Data

[63] Continuation-in-part of Ser. No. 727,524, Apr. 26, 1985.

[51] Int. Cl.$^4$ .................................................. B05D 3/02
[52] U.S. Cl. .................................... 427/226; 427/228; 427/229
[58] Field of Search .................... 427/226, 228, 227

[56] References Cited

U.S. PATENT DOCUMENTS

| | | | |
|---|---|---|---|
| 2,872,350 | 7/1955 | Homer et al. | 427/248.1 |
| 2,922,819 | 1/1960 | Chatt et al. | 260/606.5 |
| 3,061,465 | 10/1962 | Norman et al. | 427/262 |
| 3,064,021 | 11/1962 | Wilkinson | 260/429 |
| 3,070,615 | 12/1962 | Seyferth | 260/429.7 |
| 3,155,532 | 11/1964 | Basile | 427/229 |
| 3,266,875 | 8/1962 | Romeo | 23/349 |
| 3,272,600 | 9/1966 | Sowden et al. | 23/344 |
| 3,377,141 | 4/1968 | Hardy et al. | 23/345 |
| 3,494,738 | 2/1970 | Gray et al. | 23/208 |
| 3,529,988 | 9/1966 | Woerner | 427/228 |
| 3,554,782 | 8/1967 | Nieberlein | 427/228 |
| 3,574,672 | 4/1971 | Tarver | 427/249 |
| 3,764,550 | 10/1973 | Block et al. | 252/301.1 R |
| 3,800,023 | 3/1974 | Haas | 423/7 |
| 3,836,631 | 9/1974 | Tagawa et al. | 252/256 |
| 3,865,745 | 2/1975 | Block et al. | 252/301.1 R |
| 3,880,769 | 4/1975 | Googin et al. | 423/7 |
| 3,976,749 | 8/1976 | Wedemeyer | 423/251 |
| 3,979,500 | 9/1976 | Sheppard et al. | 423/289 |
| 4,010,294 | 3/1977 | Birchall et al. | 427/226 |
| 4,080,431 | 3/1978 | Moss | 423/289 |
| 4,333,915 | 1/1982 | Iwaii | 423/324 |
| 4,333,916 | 6/1982 | Iwai et al. | 423/324 |
| 4,426,366 | 1/1984 | McCandlish et al. | 423/365 |
| 4,447,263 | 5/1984 | Sugizawa et al. | 427/226 |
| 4,668,531 | 5/1987 | Asano et al. | 427/226 |

FOREIGN PATENT DOCUMENTS 1329628  5/1963  France .
1359694  3/1964  France .

OTHER PUBLICATIONS

Yajima, "Synthesis of Ceramics Using Organometallic Polymers," Kagaku Kojo 23(7):38–41 (1979) (Abstract).
Hurd et al., *Ind. and Eng. Chem.* 44(10):2432–2435 (Oct. 1952).
Derwent Abstract No. 09810x/06 (6th Week 1976).
Derwent Abstract No. 02749x/26 (2nd Week 1976).
Chemical Abstract No. 7742j, vol. 73 (1970), p. 294.
Chemical Abstract No. 105,373h, vol. 79 (1973), p. 441.
Chemical Abstract No. 111,618g, vol. 85 (1976), p. 200.
Chemical Abstract No. 164,968c, vol. 85 (1976), p. 329.
Chemical Abstract 77,559x, vol. 86 (1977), p. 325.
Chemical Abstract No. 92,657w, vol. 86 (1977), p. 184.
Chemical Abstract No. 167,514m, vol. 91 (1979), p. 680.
Chemical Abstract No. 195,951k, vol. 99 (1983), p. 37.
Chemical Abstract No. 195,948q, vol. 99 (1983), p. 37.
Chemical Abstract No. 51,763s, vol. 100 (1984), p. 593.
Hasegawa et al., *J. Mat. Sci.* 18:3633–3648 (1983).
*Metal Progress*, pp. 45–48 (Jan. 1986).
Wachtman, Jr. et al., *Chem. Eng. Prog.*, pp. 39–46 (Jan. 1986).
Laine et al., *J. Organometal. Chem.* 124:29–35 (1977).
Omori, M. et al., *Bull. Chem. Soc. Japan* 48(4):1291–1295 (1975).
Yajima, S. et al., *Nature* 267: pp. 823–825 (1977).
Yajima, S., et al., *Ceramic Bulletin* 56(12):1060–1062 (1977).
Yajima, S. et al., *Nature* 266(7): pp. 521–522; 522–523 (1977).
Yajima, S. et al., *J. Mat. Sci.* 13:2569–2576 (1978).
Yajima, S. et al., *Nature* 273(15):525–527 (1978).
Chemical Abstract No. 94,774.
Aylett, *J. Chem. Soc., Dalton Trans.*, No. 20:2058–2061 (1977).
Sugiyama, *J. Electrochem. Soc.* (Nov. 1975), pp. 1545–1549.
Aylett, *Vacuum* 35:435–439 (1985).
Shunk, F. A., *Constitution of Binary Alloys, Second Supplement*, McGraw-Hill, N.Y. (1969), pp. 140–172.
Gorgoraki et al., *J. Appl. Chem. USSR* 46(7):1639–1641 (1974).
Mulay et al., *J. Organometal. Chem.* 178:217–226 (1979).
Schwartzkopf et al., *Refractory Hard Metals: Borides, Carbides, Nitrides and Silicides* (New York, MacMillen and Co., 1953).
Chemical Abstracts No. 78,827x, vol. 74 (1971), p. 161.

*Primary Examiner*—Janyce Bell
*Attorney, Agent, or Firm*—Irell & Manella

[57] ABSTRACT

Coatings of metals, metal alloys, metal carbides, nitrides, borides, silicides and phosphides are provided. A precursor having organic ligands bonded to one or more metal atoms, such precursor having the element X also bonded directly or indirectly to the metal or metals, is pyrolyzed on a substrate surface to give a coating of $M_aX_b$. M represents a transition, lanthanide or actinide metal or tin, X represents C, N, B, Si, or P, and a and b represent the atomic proportions of M and X. The subscript b may be zero if an alloy or pure metal is to be prepared. The product $M_aX_b$ can be prepared by relatively low temperature pyrolysis and the precursor can be used as a solution or a low melting solid.

29 Claims, No Drawings

METHOD OF PREPARING COATINGS OF METAL CARBIDES AND THE LIKE

CROSS-REFERENCE TO RELATED APPLICATIONS

This application is a continuation-in-part of U.S. application Ser. No. 06/727,524, filed 26 Apr. 1985.

FIELD OF THE INVENTION

This invention relates to the preparation of coatings of metal carbides, nitrides, silicides, borides and phosphides and to other metallic products.

BACKGROUND

By way of example of methods used in the prior art, tungsten metal in finely divided form is mixed with carbon black and the mixture is heated typically to a temperature of about 1700° to 2300° C. This results in tungsten carbide which is usually mixed with a binder metal such as cobalt and is then subjected typically to shaping into the desired shape, presintering, shaping and sintering.

Other hard metal powders are produced in similar fashion except that carburization is done at the metal oxide stage rather than with the metal itself.

Such methods pose difficulties such as the need for very high temperatures. Further difficulties are also encountered. If it is desired, for example, to apply the carbide as a coating, it has to be done by chemical vapor deposition or physical vapor deposition which is limited to line of sight procedures.

SUMMARY OF THE INVENTION

It is an object of the present invention to provide better methods of producing metal carbides, nitrides, silicides, borides, phosphides, etc., also metal alloys, such methods providing one or more of the following advantages:

(1) Lower temperatures in the preparation of coatings of the metal compound or alloy $M_aX_b$ wherein M represents the metal or metals, X represents the combining element or elements and the subscripts a and b represent the atomic proportions of M and X;

(2) A simplified procedure;

(3) Greater control over the combining proportions, a and b;

(4) More facile methods of application of $M_aX_b$ to end products; and (5) Potential routes to materials or material morphologies that have heretofore been impossible or difficult to prepare.

These and other objects of the invention will be apparent from the ensuing description and the appended claims.

DETAILED DESCRIPTION

I have found that organometallic complexes of the selected metal (hereinafter called precursors) can be prepared which are soluble in common organic solvents or can be melted at relatively low temperatures. Melts of solid precursors can be shaped into fibers, rods, etc. and pyrolyzed. And, as also described in co-pending application Ser. No. 727,524, the disclosure of which is incorporated by reference herein, solutions can be applied to the surface of a substrate, heated to vaporize the solvent and then pyrolyzed on the surface. The pyrolysis can be carried out at relatively low temperatures to provide the substance $M_aX_b$. Yet the precursors are not so volatile that they cannot be pyrolyzed.

The organometallic precursor contains the metal M associated with the element X and with ligands. The element X may be bonded directly to M or it may be contained in one or more of the ligands, such that upon pyrolysis the ligands are lost with the exception of X which is bound to, or which becomes bound to the metal M. Preferably the ligands are free of halogen or oxygen directly bonded to the metal M. When possible, the precursor is designed such that there are multiple bonds between M and X to increase the likelihood that these two elements will retain a bonding interaction during pyrolysis. M represents a single metal or two or more different metals and X represents one or more elements.

The ligands endow the precursor with solubility in organic solvents to provide a material which is solid and meltable. Therefore solutions or melts of the precursors can, for example, be applied to a surface by dipping or brushing to give a coating after pyrolysis. Solutions of the precursors, if sufficiently viscous and non-volatile, may also be extruded in the form of rods, fibers, etc. The precursors may in certain cases be polymerized and the polymers may be shaped into the intended form before pyrolysis. Polymeric precursors may result directly from the method of preparation. The precursors can be pyrolyzed at relatively low temperatures. The method of application as coatings is not limited to line of sight.

Another aspect of the invention is the use of certain non-volatile precursors which upon pyrolysis leave the metal M in pure form; i.e., the complex forms the metal M and does not form a metal carbide, nitride, etc. This aspect of the invention is useful in depositing refractory metals such as tungsten on substrates such as steel, titanium, ceramics, silicon and gallium arsenide. An example of a suitable non-volatile precursor for cobalt is $Co_6(CO)_{16}$ described in Advances in Organometallic Chemistry, Vol. 14, page 287 (1976).

In another embodiment of the invention the component X is another metal rather than carbon, nitrogen, silicon, boron or phosphorus and the end product is an alloy. The use of precursors of the present invention to produce alloys is useful where the alloy has a high melting point and is to be deposited on a substrate which is low melting or which would be damaged by contact with the molten alloy.

Examples of M and X pairs are set forth in Table I. X may be carbon, nitrogen, silicon, boron or phosphorus. X may also be a metal other than M. M is a transition metal, a lanthanide metal, an actinide metal or tin. It will be understood that M may be more than one metal and that X may be one or more of the elements C, N, B, Si or P.

TABLE I

| M | X | M | X | M | X = M1 |
|---|---|---|---|---|---|
| Ti | C | Fe | N | Ag | Ru |
| W | C | Hf | N | Ag | Pd |
| Hf | C | Ta | N | Nb | Sn |
| Fe | C | Ti | B | Co | Nd |
| Cr | C | Fe | B | Co | Fe |
| Ta | C | Fe | Si | Au | Pd |
| Cr | C | Pd | Si | Au | Ru |
| V | C | Ru | Si | Co | Zn |
| Nb | C | Rh | Si | | |
| Ti | N | Co | P | | |

TABLE I-continued

| M | X | M | X | M · X = M1 |
|---|---|---|---|---|
| W | N | Re | P | |

Examples of suitable solvents for the precursors are CH$_2$Cl$_2$, CHCl$_3$, CO$_2$, SO$_2$, sulfolane, MeOH, EtOH, Et$_2$O, Et$_2$O, glyme, diglyme, THF, freon, benzene, toluene, DMSO, DMF, N-methylpyrollidone, hexane, and pentane.

Coating of a substrate surface by pyrolysis of the precursors described herein is effected as follows. The precursor is dissolved in a selected solvent to give a precursor solution. The concentration of precursor in the solution will vary depending on the thickness of the coating desired. The precursor solution is applied to the surface of the selected substrate, one which must withstand the temperatures used in pyrolysis, by any number of techniques, e.g., spraying, dipping, painting, or the like. If desired, the final coating may be made thicker by applying several coats of precursor solution and allowing the substrate to dry between applications. The precursor-coated substrate is then placed in, e.g., a quartz or nickel boat and pyrolyzed in an inert atmosphere, for example under nitrogen or argon, at a temperature in the range of about 500° C. to 950° C. Preferably, the pyrolysis is carried out for at least about 10 minutes, typically 10 to 60 minutes or more. A substrate coated with the compound $M_aX_b$ as defined above results.

In an alternative embodiment, the precursor may be applied to the substrate directly without first dissolving in a suitable solvent, and then pyrolyzed. In such a case, it may be desirable to melt the precursor prior to application to the substrate surface.

The following specific examples will serve to illustrate the practice and advantages of the invention.

EXAMPLE 1

Preparation of Tungsten Carbide and Oxycarbide (Cp$_2$W$_2$(CO)$_4$DMAD)    Compound 1

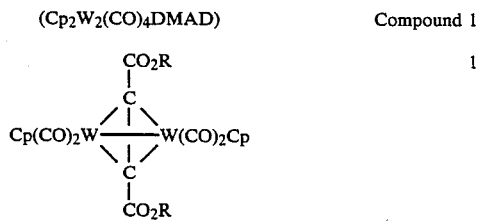

1 was prepared as described by Ford and Laine in the *Journal of Organometallic Chemistry*, 124: 29 (1977) (Cp represents cyclopentadienyl). Precursor 1 (0.185 g) was placed into a 3" long ¼ OD stainless steel tube closed on one end. The tube was placed vertically in a quartz reaction tube fitted with an inlet and an outlet for purging with argon. The material was pyrolyzed in an argon atmosphere at 800° C. for about one hour. Elemental analysis of the resulting black powder (0.114 g) gave the following: C, 22.32%; H, 0.64%; W, 71.22%. The yield, based on W, was 84%. Pyrolysis according to this procedure thus gave tungsten carbide.

Pyrolysis in a quartz tube using the same procedure gives tungsten oxycarbide, W$_2$(C,O). While not wishing to be bound by any theory, the inventor herein postulates that the difference in results is due to the fact that quartz acts as a source of oxygen, thus giving the oxycarbide rather than the carbide.

The tungsten oxycarbide is useful to coat alloys and as electrode material in electrochemical reactions.

The tungsten carbide, W$_2$C, is useful for hard, corrosion and wear resistant surfaces and can be used on cutting edges for machining tools.

The compound 1 is soluble in common organic solvents such as methanol, methylene dichloride, diethyl ether, etc. In solution form it can be applied to a substrate, for example, by spraying, brushing or dipping. Upon heating, the solvent is evaporated and the compound 1 can be pyrolyzed to form a carbide or oxycarbide.

Compound 1 may also be used as such without dissolving it in a solvent and polymer derivatives can be formed into rods, fibers or other shapes and pyrolyzed.

EXAMPLE 2

Preparation of Titanium Diboride

The organometallic precursor, Cp$_2$Ti(BH$_4$)$_2$, was prepared by the method described by A. S. Lee, K. Isagawa, and Y. Otsuji, *Chem. Lett.* 1984, 363–366, by reaction of Cp$_2$TiCl$_2$ with excess NaBH$_4$ in THF. The resulting purple complex (purified by filtration and vacuum removal of solvent) was very air sensitive. The solid material was transferred to both nickel and quartz pyrolysis tubes in a dri-box and under argon and into a pyrolysis oven. After heating at 850° C. for 20 min., x-ray powder analysis showed TiB$_2$ and TiC present in approximately 20 and 30% amounts, respectively. Very small particle sizes were obtained, less than 30 A.

EXAMPLE 3

Preparation of Ruthenium Silicide

Method 1 (Precursor 2). To 8.9 mmol of octamethyltetrasilane were added 0.3 mmol of Ru$_3$(CO)$_{12}$ and the solution was heated at 135° C. in one atmosphere of hydrogen for 3 hours. A deep orange insoluble material precipitated and was washed with petroleum ether. The yield was 0.4 gram. The material was insoluble in methylene chloride but soluble in THF and methanol. It was very hygroscopic in air. Infrared analysis of the solution in THF shows peaks at 2060 (w), 2042 (w), 2038 (sh), 2023 (w), 2004 (m), 1978 (vs)cm$^{-1}$. The product is thus believed to have the formula

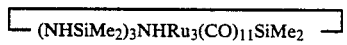

2

Method 2 (Precursor 3). To 7.5 mmol of tetramethyldisilazane was added 0.08 mmol of Ru$_3$(CO)$_{12}$ and the solution was heated at 135° C. under 1 atmosphere of hydrogen for about 1 hour. The Ru$_3$(CO)$_{12}$ disappeared completely. The solution was evaporated. An oily orange residue remained in the flask. IR analysis (CH$_2$Cl$_2$) of the metal carbonyl gave: 2121 (w), 2101 (s), 2028 (vs) 2010 (vs), 1953 (sh)cm$^{-1}$. The formula of 3 is believed to be

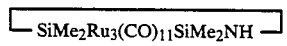

3

Method 3 (Precursor 4). This precursor, [(C$_2$H$_5$)$_3$Si]$_2$·Ru$_3$(CO)$_{10}$, is prepared by the method of Georg Suss-Fink described in his Habilitionsschrift entitled "Stochiometrische und Katalytische Aktivierungsreaktionen an dreikernegen Klustern des Osmiums und Rutheniums", University of Bayreuth, 1983.

Pyrolysis of each of 2, 3 and 4 at 800° C. for 2 hours yields ruthenium silicide, RuSi.

EXAMPLE 4

Preparation of Metal Nitrides and Phosphides

Metal nitride and metal phosphide precursors may be those described by Williams, Geoffrey and Whittle in J. Am. Chem. Soc. Vol. 107, pages 729–731 (1985), for example the nitrene compounds 5a and 5b described in Scheme 1 on page 729 or the phosphinidene analogue in which the nitrogen is replaced by phosphorus. Upon pyrolyzing at 800° C. for 2 hours an iron nitride or phosphide will result. By substituting other metals for iron the corresponding nitrides and phosphides will result.

Among suitable precursors are the following which are described in the literature.

TABLE II

| Precursor | Literature Reference |
|---|---|
| Carbide Precursors | |
| $Fe_5(CO)_{15}C$ | Adv. Organometallic Chem. (1976) 14, 285, 288–289 |
| $[Fe_6(CO)_{16}C]^{2-}$ | Adv. Organometallic Chem. (1976) 14, 285, 288–289 |
| $[Co_8(CO)_{18}C]^{2-}$ | Adv. Organometallic Chem. (1976) 14, 285, 288–289 |
| $Ru_6(CO)_{17}C$ | Adv. Organometallic Chem. (1976) 14, 285, 288–289 |
| $Ru_6(CO)_{14}(C_9H_{12})C$ | Adv. Organometallic Chem. (1976) 14, 285, 288–289 |
| $[Rh_6(CO)_{15}C]^{2-}$ | Adv. Organometallic Chem. (1976) 14, 285, 288–289 |
| $Rh_8(CO)_{19}C$ | Adv. Organometallic Chem. (1976) 14, 285, 288–289 |
| $Rh_{12}(CO)_{25}(C_2)$ | Adv. Organometallic Chem. (1976) 14, 285, 288–289 |
| $[Rh_{15}(CO)_{28}(C)_2]^-$ | Adv. Organometallic Chem. (1976) 14, 285, 288–289 |
| $Ru_5C(CO)_{15}$ | Adv. Organometallic Chem. (1976) 14, 285, 288–289 |
| $Os_5C(CO)_{15}$ | J. Organometallic Chem. (1973) 57, C82–C83 |
| $Co_2(CO)_6(RC\equiv CR)$ (R = alkyl, aryl) | Ibid (1983) 259, 253 |
| $Ru_6C(CO)_{16}C_6H_2(CH_3)_3$ | Adv. Organomet. Chem. (1976) 14, 285 |
| $Ru_6C(CO)_{17}$ | Adv. Organomet. Chem. (1976) 14, 285 |
| $Cp_2VC\equiv C-C(CH_3)_3$ | J. Organometallic Chem. (1984) 265, 249–255 |
| Alkylidynetricobalt-nonacarbonyl complexes | J. Organometallic Chem. (1976) 162, 89–98 |
| $Cp_2W_2Ir_2(CO)_6(\mu_3\text{-}CPh)\text{-}(\mu_3\text{-}\eta^3\text{-}C_3Ph)$ | Organometallics (1984) 3, 158 |
| $Cp_2Ti(PhC\equiv CPh)$ | J. Organometallic (1983) 243, 157 |

Certain metal complexes containing two metals in the complex may be pyrolyzed to produce an alloy of the two metals. Examples are given in Table III.

TABLE III

| Precursor | Literature Reference |
|---|---|
| Alloy Precursors | |
| $[CpYb]Co(C_5H_4R)_2(\mu_3\text{-}CO)_4$ | J. Chem. Soc. Chem. Commun. (1984) 809 |
| $[Re_4Cu_2H_{16}L_6](PF_6)_2$ | J. Am. Chem. Soc. (1983) 105, 5137 |
| $Au_2Ru_4(\mu_3\text{-}H)_2(CO)_{12}(PPh)$ | J. Chem. Soc. Chem. Commun. (1983) 1332 |
| $Ln[Co(CO)_4]_2$ [Ln = Sm/Eu/Yb] | Adv. Organometallic Chem. (1976) 19, 285, 288, 289 |
| $[Co_5Ni_2(CO)_{14}]$ | Adv. Organomet. Chem. (1976) 14, 285 |

TABLE III-continued

| Precursor | Literature Reference |
|---|---|
| $[Co_4Ni_2(CO)_{14}]^{2-}$ | Adv. Organomet. Chem. (1976) 14, 285 |
| $[Mo_2Ni_3(CO)_{16}]^{2-}$ | Adv. Organomet. Chem. (1976) 14, 285 |
| $[W_2Ni_3(CO)_{16}]^{2-}$ | Adv. Organomet. Chem. (1976) 14, 285 |
| $(Cp)_2NbH_2ZnCp$ | Organometallics (1984) 3, 156 |
| Nitride Precursors | |
| $H_2Ru_3(CO)_9NH$ | J. Chem. Soc. Chem. Commun. (1984) 186 |
| $[FeRu_3N(CO)_{12}]^-$ | JACS (1984) 106, 4799 |
| $NOs(CH_2SiMe_3)_4$ | JACS (1984) 106, 7493 |
| $[W(NPh)Me_3]_2(\mu\text{-}\eta^1,\eta^1\text{-}NH_2NH_2)(\mu\text{-}\eta^2, \eta^2NHNH)$ | JACS (1984) 106, 8316 |
| Boride Precursors | |
| $(H)Fe_3(CO)_9(\mu_3\text{-}BH_4)$ | JACS (1984), 106 4633 |
| $HFe_4(CO)_{12}BH_2$ | Organometallics (1983) 2, 825 |
| $(C_4H_4B\text{—}Ph)Ru(CO)_3$ | Angew. Chem. Int. Ed. (1983) 22, 996 |
| $V(C_5H_5B\text{—}CH_3)_2$ | J. Organomet. (1984) 265, 225 |

The precursor may be in the form of a polymer. A polymer has the advantage of being more easily shaped, spun, etc. Examples of such polymers and their preparation are as follows.

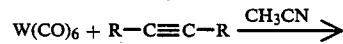

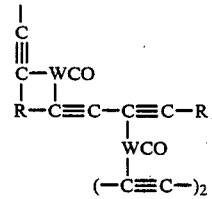

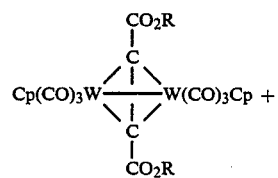

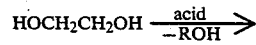

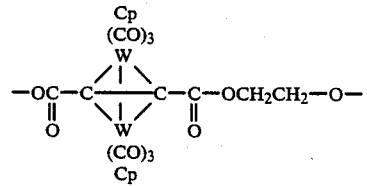

EXAMPLE 5

Preparation of Tungsten Coatings

Under nitrogen, $W_2(NMe)_6$, 0.33 g, was dissolved in 12 g of hexane. Sand-blasted 316 stainless steel plates (1"×1") and quartz slides were repeatedly immersed in the hexane solution and let dry to form coatings. Typical coatings involved 10 repetitions. The plates were placed under nitrogen in a quartz reactor fitted with inlet and outlet tubes to allow a purging stream of argon to go through the reactor. The quartz tube was placed in furnace at room temperature, and slowly heated to 800° C. over a one-hour period. Both types of plates became black after the reaction. Analyses of the stainless steel plates by x-ray diffraction showed a coating of elemental tungsten on the surface as well as oxygen. The quartz plates, however, as analyzed by Auger (the surfaces of the quartz plates were too thin to be analyzed by x-ray diffraction methods), showed evidence of both tungsten carbide and some tungsten oxide.

It will therefore be apparent that new and useful methods of producing metal carbides, nitrides, borides, silicides and phosphides, metal alloys, and pure metals, have been provided. Also new and useful precursors for the same and new methods and materials have been provided for applying metal carbides, etc., metal alloys and pure metals as coatings on solid substrates and for forming such materials into useful shapes such as fibers, rods, etc.

I claim:

1. A method of applying a coating of a material $M_aX_b$ to a surface of a solid substrate, wherein M represents one or more metals selected from the group consisting of transition metals, lanthanide metals, actinide metals and tin, X represents one or more elements selected from the group consisting of C, N, B, Si and P, and a and b represent the atomic proportions of M and X, where b is other than zero, wherein the method comprises:
    (a) providing a precursor to $M_aX_b$ that is nonvolatile upon pyrolysis and which comprises an organometallic complex, said complex including one or more metal atoms M which may be the same or different, and wherein each of said metal atoms M is bound to an organic ligand, said organometallic complex further containing the element X either directly bound to one or more of said metal atoms M or contained within said ligands or both, and wherein said organometallic complex is substantially free of metal-oxygen or metal-halogen bonds;
    (b) either:
        (i) dissolving said precursor in a solvent to give a precursor solution; the solvent selected such that the precursor can be dissolved; or
        (ii) melting said precursor;
    (c) applying said precursor to the surface of the substrate to be coated; and
    (d) pyrolyzing said precursor-coated substrate at a temperature in the range of 500° C. to 950° C.

2. The method of claim 1 wherein X is carbon and the surface coating is a carbide.

3. The method of claim 1 wherein X is nitrogen and the surface coating is a nitride.

4. The method of claim 1 wherein X is boron and the surface coating is a boride.

5. The method of claim 1 wherein X is silicon and the surface coating is a silicide.

6. The method of claim 1 wherein X is phosphorus and the surface coating is a phosphide.

7. The method of claim 1, wherein said organometallic complex contains the element X bound directly to one or more of said metal atoms M.

8. The method of claim 1 wherein b is zero and the surface coating is of the metal M.

9. The method of claim 1 wherein the pyrolysis is conducted in an inert atmosphere.

10. The method of claim 9 wherein the pyrolysis is conducted for about 10 to 60 minutes.

11. The method of claim 1 wherein step (c) is repeated one or more times.

12. A method of applying a coating of a material $M_aX_b$ to a surface of a solid substrate, wherein M represents one or more metals selected from the group consisting of transition metals, lanthanide metals, actinide metals and tin, X represents a metal other than M, and a and b represent the atomic proportions of M and X, where b is other than zero, wherein the method comprises:
    (a) providing a precursor to $M_aX_b$ that is nonvolatile upon pyrolysis and which comprises an organometallic complex, said complex including one or more metal atoms M which may be the same or different, and wherein each of said metal atoms M is bound to an organic ligand, said oganometallic complex further containing the element X either directly bound to one or more of said metal atoms M or contained within said ligands or both, and wherein said organometallic complex is substantially free of metal-oxygen or metal-halogen bonds;
    (b) either:
        (i) dissolving said precursor in a solvent to give a precursor solution; the solvent selected such that the precursor can be dissolved; or
        (ii) melting said precursor;
    (c) applying said precursor to the surface of the substrate to be coated; and
    (d) pyrolyzing said precursor-coated substrate at a temperature in the range of 500° C.

13. The method of claim 1, wherein the precursor contains two or more metal atoms M.

14. The method of claim 12, wherein the precursor contains two or more metal atoms M.

15. The method of claim 7, wherein said organometallic complex contains multiple bonds between M and X.

16. The method of claim 12, wherein the pyrolysis is conducted in an inert atmosphere.

17. The method of claim 16, wherein the pyrolysis is conducted for about 10 to 60 minutes.

18. A method of applying a coating of a material $M_aX_b$ to a surface of a solid substrate, wherein M represents one or more metals selected from the group consisting of transition metals, lanthanide metals, actinide metals and tin, X represents one or more elements selected from the group consisting of C, N, B, Si and P, and a and b represent the atomic proportions of M and X, where b is other than zero, wherein the method comprises:
    (a) providing a precursor to $M_aX_b$ that is non-volatile upon pyrolysis and which comprises an organometallic complex, said complex including one or more metal atoms M which may be the same or different, and wherein each of said metal atoms M is bound to an organic ligand, said organometallic complex further containing the element X either directly bound to one or more of said metal atoms M or contained within said ligands or both, and wherein said organometallic complex is substantially free of metal-oxygen or metal-halogen bonds;
    (b) applying said precursor to the surface of the substrate to be coated; and
    (c) pyrolyzing said precursor-coated substrate at a temperature in the range of 500° C. to 950° C.

19. The method of claim 18 wherein X is carbon and the surface coating is a carbide.

20. The method of claim 18 wherein X is nitrogen and the surface coating is a nitride.

21. The method of claim 18 wherein X is boron and the surface coating is a boride.

22. The method of claim 18 wherein X is silicon and the surface coating is a silicide.

23. The method of claim 18 wherein X is phosphorus and the surface coating is a phosphide.

24. A method of applying a coating of a material $M_aX_b$ to a surface of a solid substrate, wherein M represents one or more metals selected from the group consisting of transition metals, lanthanide metals, actinie metals and tin, X represents a metal other than M, and a and b represent the atomic proportions of M and X, where b is other than zero, wherein the method comprises:

(a) providing a precursor to $M_aX_b$ that is nonvolatileupon pyrolysis and which comprises an organometalliccomples, said complex including one or more metal atoms M which may be the same or different, and wherein each of said metal atoms M is bound to an organic ligand, said organomitallic complex further containing the element X either directly bound to one or more of said metal atoms M or contained within said ligands or both, and wherein said organometallic complex is substantially free of metaloxygen or metal-halogen bonds;

(b) applying said precursor to the surface of the substrate to be coated; and (c) pyrolyzing said precursor-coated substrate at a temperature in the range of 500° C.

25. The method of claim 24 wherein X is carbon and the surface coating is a carbide.

26. The method of claim 24 wherein X is nitrogen and the surface coating is a nitride.

27. The method of claim 24 wherein X is boron and the surface coating is a boride.

28. The method of claim 24 wherein X is silicon and the surface coating is a silicide.

29. The method of claim 24 wherein X is phosphorus and the surface coating is a phosphide.

* * * * *